United States Patent [19]

Nakagawara et al.

[11] Patent Number: 5,436,774
[45] Date of Patent: Jul. 25, 1995

[54] DUST-IMMUNE READING METHOD AND APPARATUS FOR MAGNETIC TAPE TRANSPORTS

[75] Inventors: Kazuhiko Nakagawara, Mitaka; Shuichi Saito, Tachikawa; Tatsuo Mori, Mitaka, all of Japan

[73] Assignee: Teac Corporation, Tokyo, Japan

[21] Appl. No.: 232,868

[22] Filed: Apr. 25, 1994

Related U.S. Application Data

[63] Continuation of Ser. No. 995,782, Dec. 23, 1992, abandoned.

[30] Foreign Application Priority Data

Dec. 27, 1991 [JP] Japan ................... 3-359512

[51] Int. Cl.⁶ .............................................. G11B 15/44
[52] U.S. Cl. .................................. 360/74.4; 360/38.1; 360/53
[58] Field of Search ............ 360/31, 53, 32, 77.15, 360/36.1, 33.1, 134, 38.1, 74.4, 128

[56] References Cited

U.S. PATENT DOCUMENTS

| | | | |
|---|---|---|---|
| 3,729,203 | 4/1973 | Kinard | 360/134 |
| 3,731,289 | 5/1973 | Bajgert et al. | 360/128 |
| 3,871,024 | 3/1975 | Camras | 360/33.1 |
| 4,777,541 | 10/1988 | Knowlton | 360/36.1 |
| 4,816,940 | 3/1989 | Nagasawa et al. | 360/77.15 |
| 5,050,018 | 9/1991 | Georgis et al. | 360/32 X |
| 5,251,077 | 10/1993 | Saitoh | 360/53 |

FOREIGN PATENT DOCUMENTS 57-200971 12/1982 Japan.

*Primary Examiner*—Aristotelis Psitos
*Assistant Examiner*—James L. Habermehl
*Attorney, Agent, or Firm*—Woodcock, Washburn, Kurtz, Mackiewicz & Norris

[57] ABSTRACT

A method of reading a length of multitrack magnetic tape on which data is written on each track in the form of a succession of blocks, with each data block carrying a block marker. While data on each track is being read by a transducer, the output therefrom is monitored for detecting a possible blank on the track from the block markers. The tape is stopped, rewound, and paid off again when a possible blank is detected, in order to retry reading of the detected possible blank. If the detected possible blank is due to dust accumulation on the tape or on the transducer, data written thereon may be read during the retry. Reading is discontinued if no block marker is detected during the retry. Reading of a detected possible blank may be retried only at a starting part of each track, where dust is particularly easy to accumulate, or throughout each track.

7 Claims, 4 Drawing Sheets

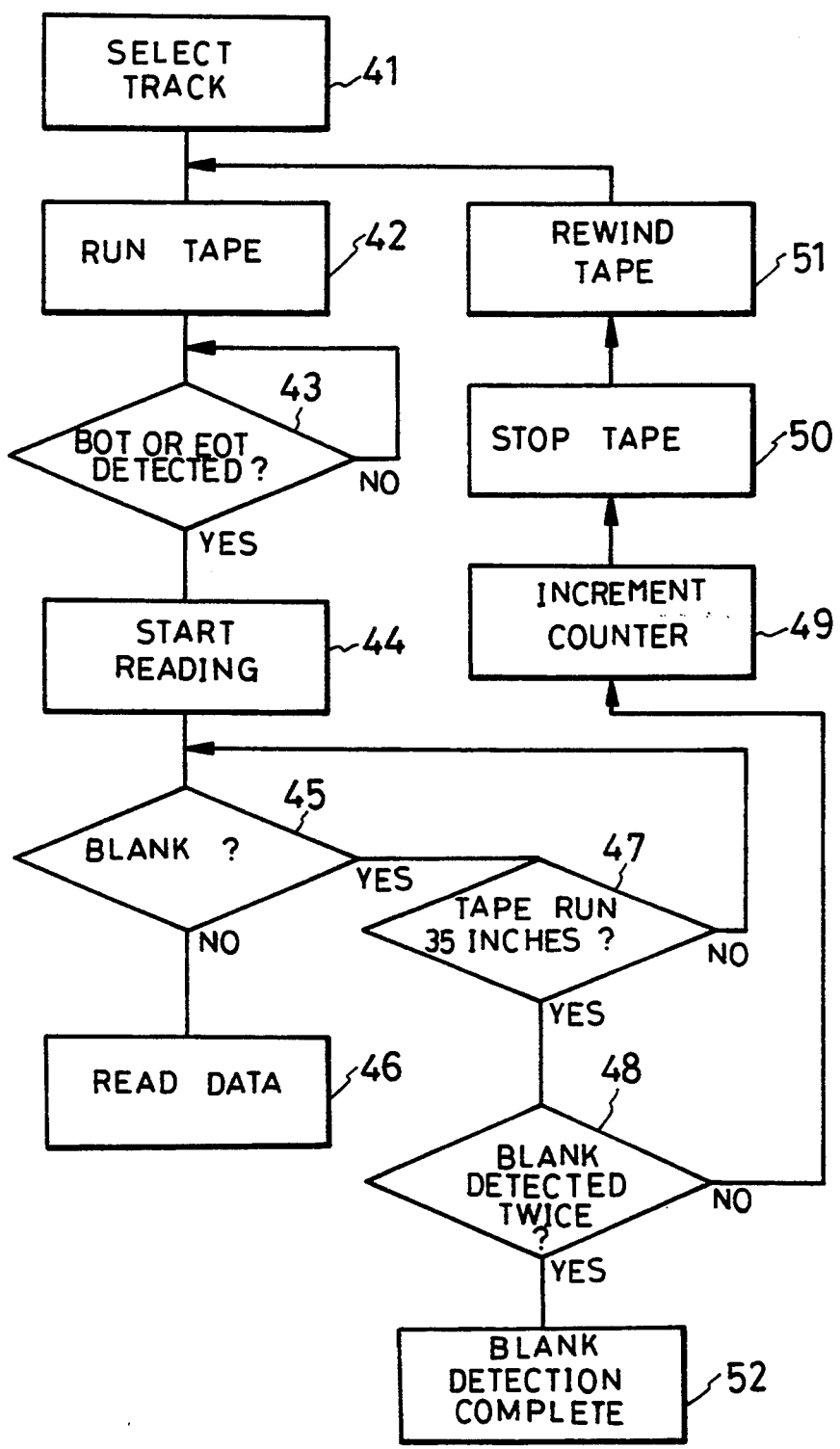

DUST-IMMUNE READING METHOD AND APPARATUS FOR MAGNETIC TAPE TRANSPORTS

This is a continuation of application Ser. No. 07/995,782, filed Dec. 23, 1992, now abandoned.

BACKGROUND OF THE INVENTION

This invention relates generally to magnetic tape transports, particularly to those suitable for use as or in a subsystem designed to enable a host system to obtain access to data on magnetic tape. More particularly, the invention relates to a method of, and apparatus for, reading data on the tape in such tape transports without being affected by dust that may accumulate on the tape or on the transducer.

Magnetic tape in cartridge form is being widely used as an external storage media of computer systems. Tape cartridges are now available in several different forms. Examples are the two-reel, belt driven cartridge introduced by Minnesota Mining and Manufacturing Company, and the "digital cassette" based on the standard audio cassette developed by Philips and made to similar dimensions though with more precision.

Such tape cartridges include a length of magnetic tape with a plurality or multiplicity of parallel tracks extending longitudinally of the tape. The tape is bidirectional, so that the tracks consist of forward tracks, on which data is written and read during tape travel in a predetermined forward direction, and reverse tracks. A stream of data is recorded on each track in the form of blocks for convenience of handling and particularly of error recovery. Each data block includes a block marker, recorded as a predefined sequence of reversals of magnetization, which indicates the presence of a data block there on the tape.

Tape transports for use with such tape cartridges include a blank detector circuit for detecting the end of the recorded data on each track of the tape. The blank detector circuit relies on the block markers for detecting a predetermined stretch of blank track, determining that the data end has been reached on the track when no block marker has been included in the output from the transducer for a preassigned length of time. Inputting this output from the blank detector circuit, the controller of the tape transport will terminate reading on the track.

A problem has been encountered in detecting the end of data blocks on each tape track as above, particularly in cases where the tape transports are used in a dusty environment. Dust on the tape or the heads can prevent the correct reading of the recorded information. If the transducer fails to read the block markers, the blank detector circuit has so far erroneously informed the controller that there is no more data on the track, even though actually there are still more data blocks left on the same track.

Usually, in bidirectional tape transports, the tape is alternately read forwardly and reversely. Such alternate bidirectional reading of the tape results in the accumulation of dust on its opposite end portions as the tape slides past the heads. Consequently, if the accumulated dust on either end portion of the tape prevents the reading of the block markers on any track, the controller has so far erroneously determined that there is no more data, or no data at all, on the track immediately after the commencement of reading on that track.

A wrong detection of data end is objectionable for two reasons. First, it makes impossible the reading of the remaining data on each tape track. Second, new data may be overwritten on the remaining data blocks with the consequent erasure of the old data.

SUMMARY OF THE INVENTION

The present invention seeks to eliminate the effects of dust in reading data on a length of magnetic tape.

According to the invention, stated in brief, the output from a transducer is monitored for detecting a possible blank of known length during the reading of data on a length of magnetic tape traveling in a first direction. When a possible blank is detected, the tape is stopped, run in a second direction, opposite to the first direction, over a predetermined length not less than the length of the detected possible blank, and again run in the first direction in order to retry reading of the detected possible blank.

Possibly, what was taken to be a blank on the tape may be due to dust accumulation on the tape or on the transducer. The dust may then be removed by running the tape back and forth past the transducer, so that data is far more likely to be read during the retry than during the initial reading. On the other hand, if the detected blank tape portion is truly blank, then no block markers will be detected during the retry, either. Reading may then be discontinued.

Dust is particularly easy to accumulate as aforesaid on the opposite end portions of a length of bidirectional, multitrack tape. It is therefore recommended that the rereading of any detected possible blank, taught by the invention summarized above, be tried only on the starting end portions of the bidirectional tracks. The remainders of the tracks may be read conventionally since read errors due to dust is far less likely to occur on other than the starting end portions of the tracks.

The above and other features and advantages of this invention and the manner of realizing them will become more apparent, and the invention itself will best be understood, from a study of the following description and appended claims, with reference had to the attached drawings showing the best mode of carrying out the invention.

BRIEF DESCRIPTION OF THE DRAWINGS

FIG. 4 is a flow chart explanatory of how data is read according to the invention;

DESCRIPTION OF THE PREFERRED EMBODIMENT

Figure 1:
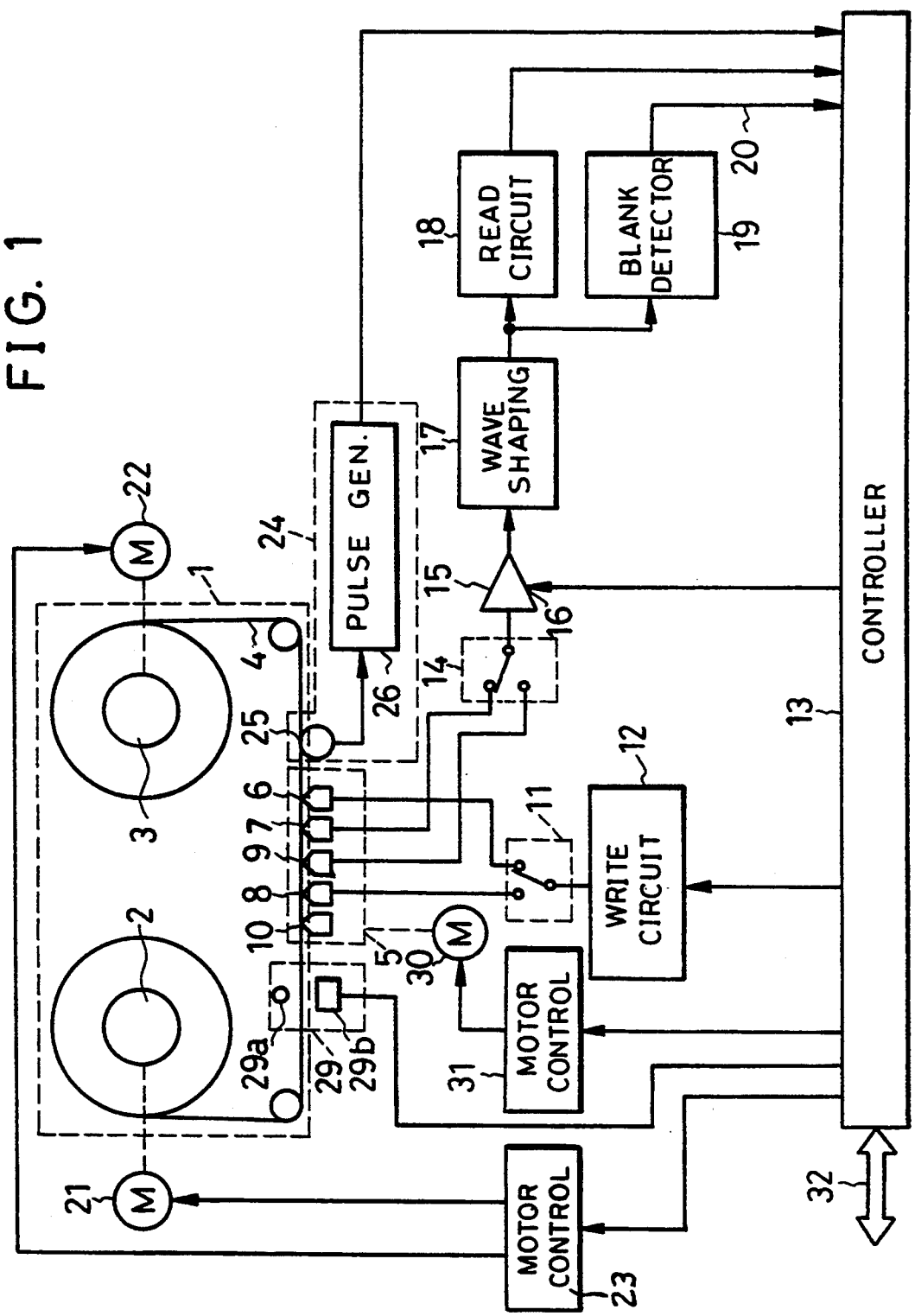
FIG. 1 is a block diagram of a tape transport embodying the principles of this invention.

The present invention will now be described in detail as applied to a tape transport for use with the Philips bidirectional, multitrack "digital cassette". As illustrated in FIG. 1, the exemplified tape cassette or cartridge 1 has a pair of reel hubs 2 and 3 carrying a length of magnetic tape 4. With its opposite ends anchored to the respective reel hubs 2 and 3, the tape 4 extends therebetween along a predefined guide path.

Figure 2:
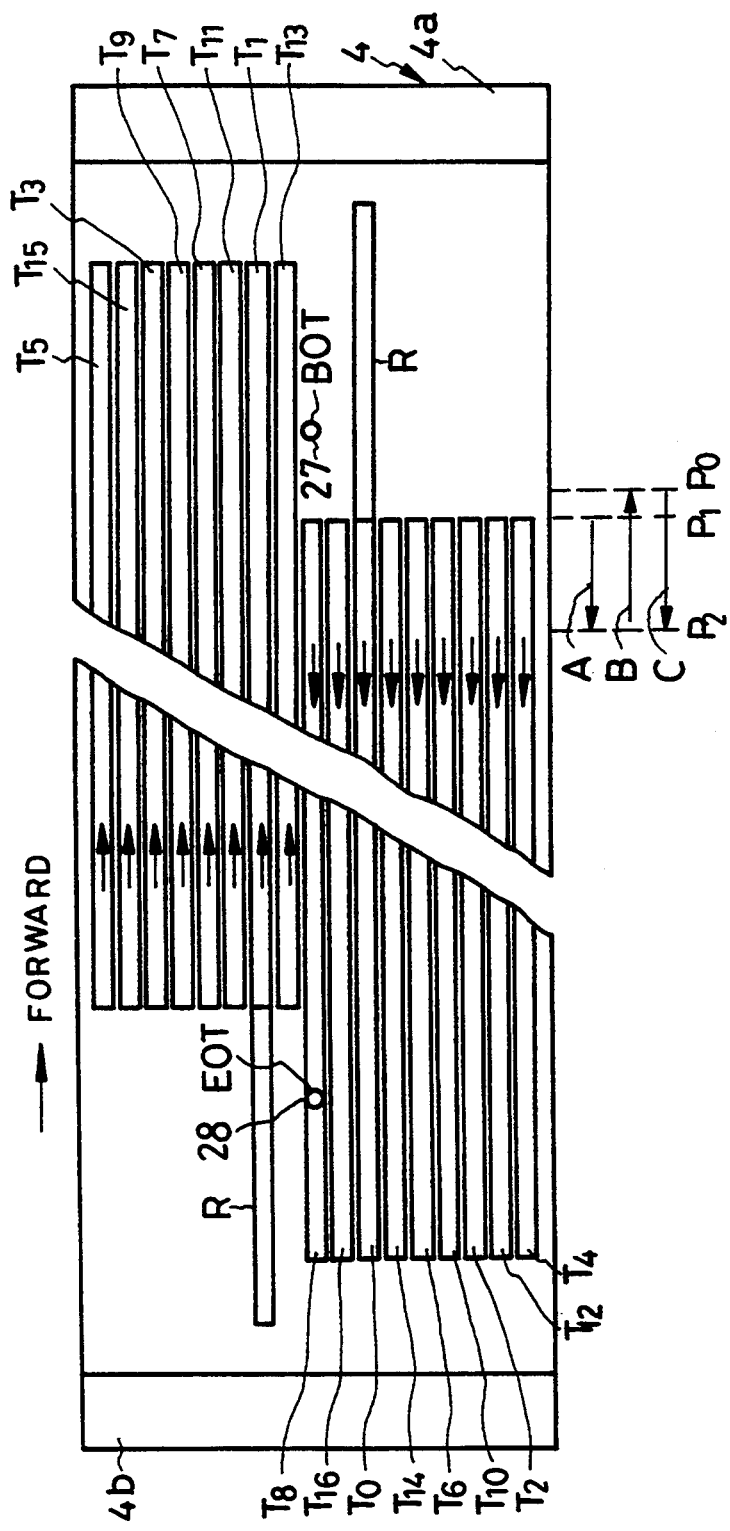
FIG. 2 is an enlarged, fragmentary plan view of a length of bidirectional, multitrack magnetic tape for use with the tape transport of FIG. 1.

As shown fragmentarily and on a greatly enlarged scale in FIG. 2, the magnetic tape 4 has seventeen tracks $T_0$–$T_{16}$ extending parallel to each other and longitudinally of the tape. Of these, the nine tracks $T_0$, $T_2$, $T_4$, $T_6$, $T_8$, $T_{10}$, $T_{12}$, $T_{14}$ and $T_{16}$ are forward tracks, that is, the tracks on which data is written and read during forward tape travel from reel hub 2 to reel hub 3. The remaining eight tracks $T_1$, $T_3$, $T_5$, $T_7$, $T_9$, $T_{11}$, $T_{13}$ and $T_{15}$ are reverse tracks, that is, the tracks on which data is written and read during reverse tape travel from reel hub 3 to reel hub 2. The tracks $T_0$–$T_{16}$ are traced in the order of the suffixes appended to the reference character T when data thereon is read continuously. Although the tracks are shown in their full lengths in FIG. 2, data is not necessarily written on the full lengths of tracks; in many cases, data is recorded only partway thereon.

Figure 3:
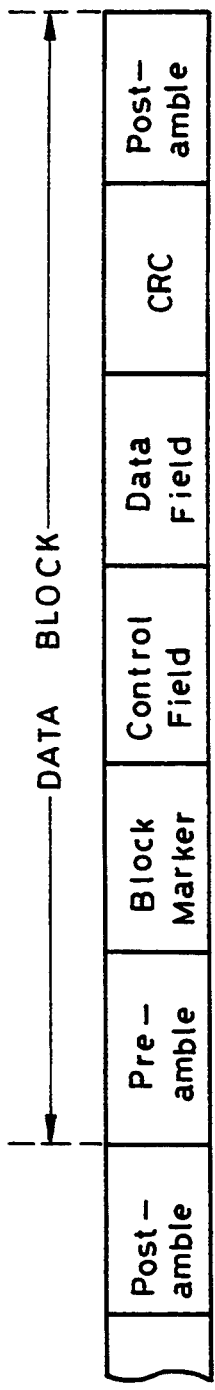
FIG. 3 shows how data is recorded on each track of the tape of FIG. 2.

Data is recorded on each track in the form of a succession of blocks. Typically, as depicted in FIG. 3, each data block contains a preamble, block marker, control field, data field, cyclic redundancy code, and postamble, in that order. The block marker is recorded as aforesaid in the form of a predetermined sequence of reversals of magnetization (e.g. 1111100111) to indicate the presence of a data block there on the tape 4.

FIG. 2 also shows a standard beginning-of-tape (BOT) marker 27 and end-of-tape (EOT) marker 28 on the tape 4. The BOT marker 27 and EOT marker 28, both shown as holes, are designed to enable the associated tape transport to sense the start and the end, respectively, of the tape where data can be, or has been, recorded. As is also conventional in the art, reference bursts R are recorded before the first forward track $T_0$ and the first reverse track $T_1$. Usually an alternating current signal of predetermined amplitude, the reference bursts R are used for gain control of a read amplifier in the tape transport. They are recorded before data is written, and recovered before data is read.

With reference back to FIG. 1 the tape transport has a transducer assembly or combination head 5 which, purely for the purpose of illustration, is shown to comprise a forward write head 6, forward read head 7, reverse write head 8, reverse read head 9, and erase head 10. The showing of all these heads in alignment is also for illustrative purposes only; in fact, the forward write head 6 and read head 7, and the reverse write head 8 and read head 9, are both displaced from each other transversely of the tape 4, and the erase head 10 has a gap extending across all the tracks on the tape.

The forward write head 6 and reverse write head 8 are both connected via a selector switch 11 to a write circuit 12 and thence to a device controller 13 which in practice may take the form of a microprocessor. Inputting information to be recorded from the controller 13, the write circuit 12 generates a write signal accordingly and delivers it to either of the forward and reverse write heads 6 and 8.

The forward read head 7 and reverse read head 9 are both connected via a selector switch 14 to a variable gain read amplifier 15. The gain of this amplifier is controlled by a gain control signal supplied from the controller 13 to its control input 16. The output of the read amplifier 15 is connected to a wave shaping circuit 17, thence to a read circuit 18, and thence to the controller 13. The read circuit 18 recreates the data read on the tape 4 by the forward or reverse head.

Also connected to the output of the wave shaping circuit 17 is a blank detector circuit 19 for detecting a blank of predetermined length on each track of the tape 4, from the block marker, FIG. 3, included in each data block. The blanks thus detected may be either actual or virtual, that is, not actually blank but taken to be blank because of dust accumulation on the tape 4 or on the transducer 5. The output of the blank detector circuit 19 is connected to the controller 13 by way of a line 20.

For bidirectionally driving the tape 4 there are provided two tape drive motors 21 and 22 which are coupled directly to the respective reel hubs 2 and 3 of the tape cassette 1. Preferably, the tape drive motors 21 and 22 are controllable speed, direct current motors. The motors are polarized in a tape winding direction; that is, the motor 21 is polarized for revolving the reel hub 2 in a clockwise direction, as viewed in FIG. 1, and the motor 22 for revolving the reel hub 3 in a counterclockwise direction. The motors 21 and 22 are both controlled by a motor control circuit 23 at the direction of the controller 23.

For closed loop servo control of the tape speed a tape speed sensor is provided at 24. The tape speed sensor 24 comprises a sensor roll 25 and a pulse generator or encoder 26. The sensor roll 25 rotates in frictional engagement with the tape 4, and the pulse generator 26 photoelectrically generates a series of tape speed pulses at a recurrence rate proportional with the tape speed. The tape speed pulses are directed into the controller 13. Reference may be had to Sakai U.S. Pat. No. 4,163,532 for more details on the tape speed sensor 24.

Also connected to the controller 13 is a BOT/EOT sensor 29 comprising a light source 29a and a photodetector 29b. This sensor 29 detects the BOT marker 27 and EOT marker 28, both shown in FIG. 2, on the tape 4, as well as the transparent zones 4a and 4b at both physical ends of the tape.

The magnetic head 6 is movable transversely of the tape 4 for accessing the individual tracks $T_0$–$T_{16}$ thereon. Employed to this end is a head drive motor 30, preferably a bidirectional stepper motor, which is coupled to the head 6 via a lead screw, not shown, or like motion translating mechanism. A head drive motor control circuit 31 controls the head drive motor 30 for causing the same to move the head 6 from track to track on the tape 4 as dictated by the controller 13.

Such being the construction of the tape transport embodying the present invention, reference is now invited to the flow chart of FIG. 4 for a detailed discussion of how data on each track on the tape 4 is read without being affected by possible dust accumulation on the tape or on the head 5, by an exemplary method according to the invention. Factory preprogrammed into the controller 13, the illustrated blank detection routine starts at 41 where the controller causes the forward read head 7 or reverse read head 9 to be positioned on the track specified by a track command supplied from the host system, not shown, over a bus 32.

Then, according to the next lock 42, the controller 13 causes the tape drive motor control circuit 23 to drive either of the tape drive motors 21 and 22. The tape 4 will then travel in either direction until either the BOT marker 27 or the EOT marker 28 is detected by the sensor 29 at a logical node 43. Thereupon the reading of data on the desired track is started according to the next block 44.

Then comes another logical node 45 where it is questioned whether the end of the data recorded on the track in question has been reached or not. In order to enable the controller 13 to determine that there is no more data on the track, the data end detector circuit 19 detects the block marker, FIG. 3, included in each data block. The controller permits reading to be continued as long as the block markers are being detected periodically, as at a block 46.

When no block marker has been detected for a preassigned time, that is, when a predetermined stretch of tape has been found to be blank on the track under consideration, it is determined at a node 47 whether the tape has traveled a predetermined length of, say, 35 inches from the BOT marker 27 or EOT marker 28, although this length may be up to 45 inches. The detection of a possible blank according to the node 45 is continued if the answer to the node 47 is no. It is understood that the controller has a tape footage counter, not shown, for the determination of whether the tape has run 35 inches or more. The tape a footage counter is reset by the output from the BOT/EOT sensor 29 upon detection of the BOT or EOT marker and incremented by each output pulse from the tape speed sensor 24.

If the answer to the node 47 is yes, that is, if a possible blank has been detected after the tape has run 35 inches or more, it is questioned at a node 48 if such detection has been made twice. If not, a blank counter, also not shown, built into the controller is incremented at a block 49.

The next block 50 dictates the termination of tape travel. Further, at the following block 51, the tape is rewound a preassigned length of 35 inches or more. In any event the tape length rewound at this juncture should not be less than the tape length that has been paid off until the tape is stopped according to the block 50. Then the routine returns to the block 42 for retrying the reading of the detected possible blank.

Possibly, the answer "yes" to the node 45 during the initial reading of the track may have been due to dust accumulation on the tape or the head, and what was taken to be a blank may not actually be. In that case, if the dust has now been removed, the block marker or markers on what was taken to be a blank portion will be read along with the desired data during the retry, so that the answer to the node 45 will be no. Reading will then be continued conventionally according to the block 46.

On the other hand, the answer to the node 45 may still be yes during the retry. The answer to the node 48 will also be yes in this case, since this is the second detection of the blank tape portion. Then the controller will discontinue reading according to a block 52 and inform the host system to this effect.

The flow chart of FIG. 4 will be better understood by referring again to FIG. 2. As indicated by the arrow A in this figure, the reading of data on, say, track $T_0$ is started in a position $P_1$ spaced from $-0.5$ to 4.0 inches from the BOT marker 27 by running the tape forwardly. If a possible blank is detected in a position $P_2$ spaced 35 inches from the position $P_1$, the tape is rewound not less than 35 inches from position $P_2$ to position $P_0$, as indicated by the arrow B. Then, as indicated by the arrow C, reading on the $P_1$-$P_2$ stretch of the track $T_0$ is retried by again running the tape forwardly.

Thus, according to the exemplified method of this invention, any detected possible blank is reread only at a starting end portion of each track, that is, only at the first 35 inches from the BOT marker 27 for each forward track and at the first 35 inches from the EOT marker 28 for each reverse track. Typically, 70 data blocks may be written at this starting end portion of each track. Such limited application of the method of this invention to reading on each track is because, as has proved by experiment, dust is particularly easy to accumulate on the first 35 inches of the tape from the BOT and EOT markers. Read errors due to dust is far less likely to occur at the other parts of the tracks, so that the application of the method of this invention to these parts will be of little avail.

It is, of course, nevertheless possible to read all the data on each track by the method of the invention. In this case the tape footage counter may be relied upon for rewinding the tape over a length not less than the known length of any detected possible blank on each track.

Figure 5:
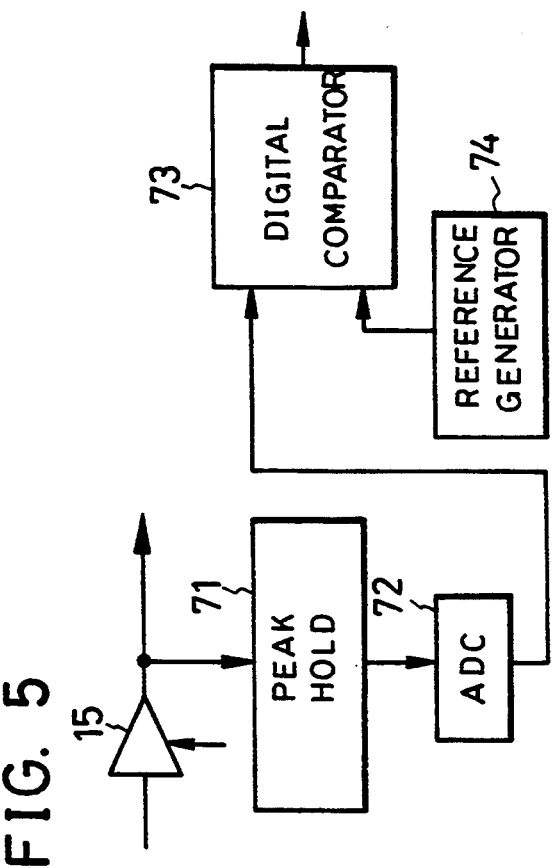
FIG. 5 is a partial block diagram of an alternate embodiment of the invention.

FIG. 5 shows another preferred embodiment of the invention, in which the magnitude of the output from the read amplifier 15 is relied upon, rather than the block markers, for detection of a possible blank on each track. Employed to this end is a peak hold circuit 71 connected to the output of the read amplifier 15. The output from the peak hold circuit 71 is directed into an analog to digital converter 72, and the digital output from the ADC is compared by a digital comparator 73 with a reference value supplied from a generator 74. Both comparator 73 and reference value generator 74 are shown included in a controller 13a, although they could be external to the controller.

Figure 6:
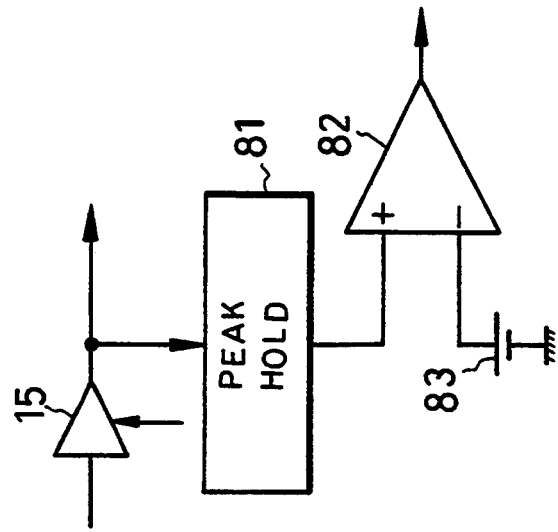
FIG. 6 is a similar diagram of another alternate embodiment of the invention.

In still another preferred embodiment shown in FIG. 6, the analog output from a peak hold circuit 81 is compared by an analog comparator 82 with a reference value supplied by a power supply 82. The analog comparator 82 has its output coupled to the controller.

Despite the foregoing detailed disclosure, it is not desired that the present invention be limited by the exact showing of the drawings or the description thereof. For example, not only the tape may be rewound for rereading when a possible blank is detected, but also the transducer may be moved transversely Of the tape, for more positively removing the is dust. It will also be readily contemplated to rereading the detected possible blank twice or more, instead of once as in the exemplified method of the invention. Further, although the BOT and EOT markers are shown as holes in FIG. 2, these markers could be strips of reflective material adhering to the tape, transparent parts of the tape, and so forth. All these and other modifications, alterations or adaptations of the invention are intended in the foregoing disclosure. It is therefore appropriate that the invention be construed broadly and in a manner consistent with the fair meaning or proper scope of the attached claims.

What is claimed is:

1. A dust-immune method of readying data on a length of multitrack magnetic tape having a tape marker, showing the start of the tape where data can be recorded, the tape having a plurality of tracks extending longitudinally parallel to the tape, the tracks having forward tracks on which data is written and read during forward tape travel and reverse tracks on which data written and read during reverse tape travel, which method comprises:

(a) positioning a magnetic head on any selected one of tracks on the tape;
   (b) running the tape in a first direction past the magnetic head;
   (c) detecting the tape marker;

(d) starting reading data on the selected track;
(e) monitoring an output from the magnetic head for detecting a blank on the selected track;
(f) continuing reading data on the selected track if the blank is not detected;
(g) ascertaining, when the blank is detected, whether the tape has run a first predetermined length from the tape marker or not;
(h) stopping the tape if the tape has run the first predetermined length from the tape marker and the blank is detected;
(i) running the tape in a second direction, opposite to the first direction, while the magnetic head is in contact with the tape over a second predetermined length which is not less than the first predetermined length;
(j) retrying reading of the detected blank by running the tape in the first direction;
(k) continuing reading data on the selected track if the blank is not detected by the retry; and
(l) discontinuing reading data on the selected track if the tape has run the first predetermined length from the tape marker and the blank is detected by the retry.

2. The dust-immune reading method of claim 1 which further comprises stopping reading if the possible blank on the selected track is still detected as a result of at least one retry.

3. The dust-immune reading method of claim 1 wherein the first predetermined length is approximately from 35 to 45 inches.

4. The invention of claim 1 wherein data is recorded on the track in the form of a succession of blocks, each block having a block market recorded thereon along with the data, and wherein the blank detector means comprises a blank detector circuit for detecting the block markers of the blocks.

5. The invention of claim 1 wherein the blank detector means comprises:
(a) a peak hold circuit connected to the magnetic head;
(b) an analog to digital converter connected to the peak hold circuit;
(c) a circuit for providing a reference value; and
(d) a comparator for comparing an output from the analog to digital converter with the reference value.

6. The invention of claim 1 wherein the blank detector means comprises:

(a) a peak hold circuit connected to the magnetic head;
(b) means for providing a reference voltage; and
(c) a comparator for comparing an output from the peak hold circuit with the reference voltage.

7. A dust-immune method of readying data on a length of multitrack magnetic tape having a tape marker, showing the start of the tape where data can be recorded, the tape having a plurality of tracks extending longitudinally parallel to the tape, the tracks having forward tracks on which data is written and read during forward tape travel and reverse tracks on which data written and read during reverse tape travel, which method comprises:
(a) positioning a magnetic head on any selected one of tracks on the tape;
(b) running the tape in a first direction past the magnetic head;
(c) detecting the tape marker;
(d) starting reading data on the selected track;
(e) monitoring an output from the magnetic head for detecting a blank on the selected track;
(f) continuing reading data on the selected track if the blank is not detected;
(g) ascertaining, when the blank is detected, whether the tape has run a first predetermined length from the tape marker or not;
(h) stopping the tape if the tape has run the first predetermined length from the tape marker and the blank is detected;
(i) running the tape in a second direction, opposite to the first direction, while the magnetic head is in contact with the tape over a second predetermined length which is not less than the first predetermined length for retrying reading of the detected blank;
(j) running the tape in the first direction past the magnetic head;
(k) detecting the tape marker;
(l) starting reading data on the selected track;
(m) monitoring an output from the magnetic head for detecting a blank on the selected track;
(n) continuing reading data on the selected track if the blank is not detected by the retry;
(o) ascertaining, when the blank is detected, whether the tape has run a first predetermined length from the tape marker or not; and
(p) discontinuing reading data on the selected track if the tape has run the first predetermined length from the tape marker and the blank is detected by the retry.

* * * * *